US009495422B2

(12) United States Patent
Arrasvuori et al.

(10) Patent No.: US 9,495,422 B2
(45) Date of Patent: *Nov. 15, 2016

(54) METHOD AND APPARATUS FOR PROVIDING A MEDIA OBJECT

(71) Applicant: Nokia Corporation, Espoo (FI)

(72) Inventors: Juha Henrik Arrasvuori, Tampere (FI); Jussi Severi Uusitalo, Hameenlinna (FI); Marja Pauliina Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,304

(22) Filed: Jan. 5, 2015

(65) Prior Publication Data

US 2015/0113005 A1 Apr. 23, 2015

Related U.S. Application Data

(63) Continuation of application No. 12/251,948, filed on Oct. 15, 2008, now Pat. No. 8,935,292.

(51) Int. Cl.
*G06F 17/30* (2006.01)
*G06F 7/00* (2006.01)

(52) U.S. Cl.
CPC ... *G06F 17/30528* (2013.01); *G06F 17/30017* (2013.01); *G06F 17/30029* (2013.01); *G06F 17/30032* (2013.01); *G06F 17/30041* (2013.01); *G06F 17/3053* (2013.01); *G06F 17/3064* (2013.01); *G06F 17/30241* (2013.01); *G06F 17/30749* (2013.01); *Y10S 707/914* (2013.01); *Y10S 707/915* (2013.01); *Y10S 707/916* (2013.01); *Y10S 707/917* (2013.01)

(58) Field of Classification Search
CPC ............... G06F 17/30241; G06F 17/30749; G06F 17/30017; G06F 17/30029; G06F 17/3064; G06F 2203/04806; G06F 1/1647
USPC ........ 707/796, 914, 915, 916, 917, 999.107; 345/660; 705/27.1
See application file for complete search history.

(56) References Cited

U.S. PATENT DOCUMENTS

| 5,572,635 A | 11/1996 | Takizawa et al. |
| 6,091,930 A * | 7/2000 | Mortimer ................ G09B 5/14 434/118 |
| 6,498,982 B2 | 12/2002 | Bellesfield et al. |

(Continued)

FOREIGN PATENT DOCUMENTS

| CN | 1497968 A | 5/2004 |
| CN | 101017506 A | 8/2007 |

(Continued)

OTHER PUBLICATIONS

Chinese Office Action for related Chinese Patent Application No. 200980140923.4 dated Nov. 21, 2012, with English-language summary, 15 pages.

*Primary Examiner* — Dung K Chau
(74) *Attorney, Agent, or Firm* — Ditthavong & Steiner, P.C.

(57) ABSTRACT

In accordance with an example embodiment of the invention, an apparatus comprising a processor configured to receive information related to a media object, and automatically select at least one supplemental media object based at least in part on a competency of a user related to the media object is disclosed.

20 Claims, 4 Drawing Sheets

(56) References Cited

U.S. PATENT DOCUMENTS

| | | | |
|---|---|---|---|
| 2004/0218894 A1 | 11/2004 | Harville et al. | |
| 2005/0071496 A1* | 3/2005 | Singal | H04L 29/06 709/232 |
| 2005/0097008 A1* | 5/2005 | Ehring | G06F 17/211 715/205 |
| 2005/0102201 A1* | 5/2005 | Linker | G06F 17/30265 705/27.1 |
| 2007/0188901 A1* | 8/2007 | Heckerman | G09B 19/00 360/23 |
| 2008/0005055 A1* | 1/2008 | Horvitz | G06Q 30/06 706/62 |
| 2008/0065668 A1* | 3/2008 | Spence | G06Q 10/06 |
| 2008/0140644 A1* | 6/2008 | Franks | G06F 17/30817 |
| 2008/0306988 A1* | 12/2008 | Aggarwal | G06F 17/30554 |
| 2009/0043497 A1* | 2/2009 | Tashev | G01C 21/3679 701/437 |
| 2009/0067586 A1* | 3/2009 | Fano | H04M 3/51 379/49 |
| 2009/0222303 A1* | 9/2009 | Higgins | G06Q 30/02 705/14.16 |

FOREIGN PATENT DOCUMENTS

| | | | |
|---|---|---|---|
| WO | 2005089403 A2 | 9/2005 | |
| WO | 2005089434 A2 | 9/2005 | |

* cited by examiner 102A-102D: STREET INFORMATION
104A-104I: POSITION INFORMATION 202A-202D: POSITION INFORMATION
204A-204B: LANDMARK INFORMATION
206A-206B: STREET INFORMATION 212, 214, 222, 224, 232, 242: LANDMARK REPRESENTATIONS
210, 220, 230, 240: VISUAL REPRESENTATIONS

METHOD AND APPARATUS FOR PROVIDING A MEDIA OBJECT

RELATED APPLICATIONS

This application is a continuation of U.S. patent application Ser. No. 12/251,948, filed Oct. 15, 2008, entitled "METHOD AND APPARATUS FOR GENERATING AN IMAGE", which is being filed concurrently and is hereby incorporated by reference in its entirety.

TECHNICAL FIELD

The present application relates generally to providing a media object.

BACKGROUND

There has been a recent surge in the usage of audio, video, images, and/or the like. With the increased availability of electronic devices and the increased availability of device connectivity, the user has unprecedented access to media information.

This plethora of media has changed the way people experience the world around them. When a user is planning to visit a place, he may now readily find media associated with that place. For example, a user of an electronic device may access a video of a park he is planning to see. In another example, a user may access images related to a building he is planning to visit.

SUMMARY

Various aspects of the invention are set out in the claims.

In accordance with an example embodiment of the invention, an apparatus comprising a processor configured to receive information related to a media object, and automatically select at least one supplemental media object based at least in part on a competency of a user related to the media object is disclosed.

In accordance with another example embodiment of the invention, a method comprising receiving information related to a media object, and automatically selecting at least one media object based at least in part on a competency of a user related to the media object is disclosed.

In accordance with another example embodiment of the invention, a computer program product comprising a computer-readable medium bearing computer program code embodied therein for use with a computer, the computer program code comprising code for receiving information related to a media object, code for automatically selecting at least one media object based at least in part on a competency of a user related to the media object is disclosed.

In accordance with another example embodiment of the invention, a computer-readable medium encoded with instructions that, when executed by a computer, perform receiving information related to a media object, automatically selecting at least one media object based at least in part on a competency of a user related to said media object is disclosed.

BRIEF DESCRIPTION OF THE DRAWINGS

For a more complete understanding of example embodiments of the invention, reference is now made to the following descriptions taken in connection with the accompanying drawings in which.

DETAILED DESCRIPTION OF THE DRAWINGS

An example embodiment of the invention and its potential advantages are best understood by referring to FIGS. 1 through 6 of the drawings.

In an example embodiment, a media object comprises image information, video information, audio information, text information, and/or the like. For example, a media object may comprise one or more images. It may be desirable to associate position information with a media object. Position information may comprise location information, heading information, elevation information, and/or the like. For example, position information may comprise information indicating a latitude of 30.267 degrees north and a longitude of 97.75 degrees east with a heading of 92 degrees north. Position information associated with a media object may relate to location information associated with the creation of the media object. For example, position information associated with a video may relate to the position of the device that captured the video. Position information may relate to a position related to the content of a media object. For example, a video of a college football team winning a championship game may have associated position information corresponding with the location of the college, even though the video of the game may have been captured at a different college.

Figure 5:
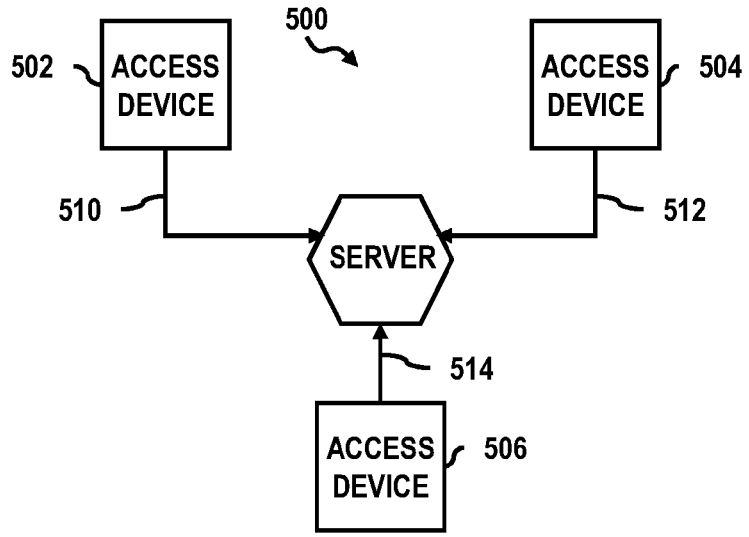
FIG. 5 is a block diagram of a system which may benefit from the teachings of the invention.

In an example embodiment, a user may be using an access device, for example access device 502 of FIG. 5. The user may select a media object to be provided. For example, the user may select a media object on a webpage. It may be desirable to determine whether the user is able to understand the context of the selected media object. If it is determined that the user may not be able to understand the context of the selected media object, one or more supplemental media objects may be provided to help the user understand the context of the selected media object. For example, the supplemental media objects may be provided before the selected media object, after the selected media object, and/or concurrently with the selected media object.

Figure 2A:
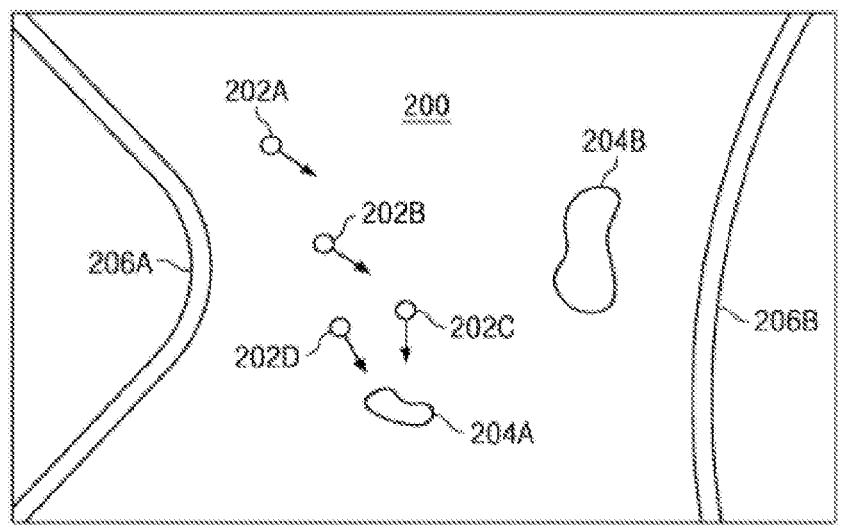
FIGS. 2A-2E are diagrams showing map information and media objects provided according to an example embodiment of the invention.

In another example embodiment, a user may be using an access device, for example access device 502 of FIG. 5 to access a media object repository which indicates media objects in relation to map information, for example map information 200 of FIG. 2A. The user may select a media object to be provided. The user may be shown a more detailed version of the map information surrounding the selected media object. For example, the device may zoom into the area surrounding the selected media object. It may be desirable to determine whether the user may be able to understand the context of the selected media object. If it is determined that the user may not be able to understand the context of the selected media object, one or more supplemental media objects may be provided to help the user understand the context of the selected media object.

Figure 1:
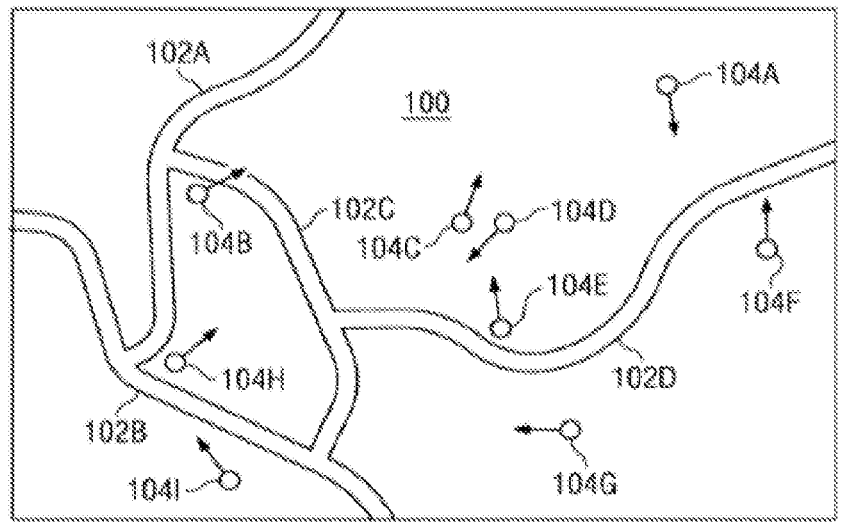
FIG. 1 is a diagram representing an example of map information which may be utilized by an example embodiment of the invention.

FIG. 1 is a diagram representing an example of map information which may be utilized by an example embodiment of the invention. It should be understood, however, that the map information of FIG. 1 as illustrated and hereinafter described is merely illustrative of information, which may be associated with a map, and therefore, should not be taken to limit the scope of the invention. It should be understood that there may be one or more methods for configuring, communicating, storing, and/or the like, map information and that such methods should not be taken to limit the scope of the invention.

Map information 100 may comprise street information, for example street information 102A-102D. Street information may comprise information related to location, speed limit, direction, route, number of lanes, a traffic condition, road surface, construction, bicycle lane information, pedestrian accommodation information, and/or the like. For example, street information may comprise information indicating a bidirectional, 2 lane, asphalt paved, street between a first location and a second location. Street information may comprise information relating to an intersection of one or more streets. For example, street information may comprise information related to traffic control related to an intersection, such as a stop sign, traffic light, traffic circle, and/or the like.

Map information 100 may comprise topographical information, zoning information, hydrological information, flora information, structure information, and/or the like. Topographical information may comprise elevation information associated with one or more locations. Zoning information may comprise information indicating that an area relates to a single family residential area, a multi-family residential area, a retail area, an industrial area, and/or the like. Hydrological information may comprise information related to a river, a lake, a pond, an ocean, a bay, and/or the like. Flora information may comprise information relating to a forest of oak trees in an area. Structure information may comprise information related to a building, a bridge, a landmark, a wall, a gate, a sculpture, and/or the like.

Map information 100 may comprise information related to position information associated with a multimedia object. For example, position information 104A-104I. In the example of map information 100, heading information associated with position information is represented in FIG. 1 by an arrow. One or more position information may relate to one or more media object. For example, position information 104D may relate to one media object. In another example, position information 104B may relate to two media objects. In yet another example, position information 104A and position information 104H may relate to similar media objects. In still another example, position information 104C and position information 104E may relate to the same media object.

It may be desirable for a user to understand context of a media object. For example, it may be desirable for a user to understand the surrounding area of the media object. In another example, it may be desirable for a user to be able to relate the media object to an area which may be familiar to the user.

A user may desire to be provided with a media object. However, a user may have a limited ability to understand the context of the media object. For example, the media object may be associated with position information related to an area unfamiliar to the user. In another example, the user may be distracted by walking, performing operations on a device, driving a vehicle, listening to music, talking on the phone, talking to a person without the use of a device, and/or the like. In an example embodiment, it may be desirable to automatically select one or more supplemental media objects, for example to help the user understand the context of the desired media object. In such an example, the supplemental media objects may be provided to the user, which may help the user to understand the context of the desired media object.

FIG. 2A-2E are diagrams showing map information and media objects provided according to an example embodiment of the invention. It should be understood, however, that the image generation of FIGS. 2A-2E as illustrated and hereinafter described are merely illustrative of visual information which may be associated with providing a media object, and therefore, should not be taken to limit the scope of the invention.

FIG. 2A is a diagram representing an example of map information 200. It should be understood, however, that the map information of FIG. 2A as illustrated and hereinafter described is merely illustrative of information which may be associated with a map, and therefore, should not be taken to limit the scope of the invention.

Position information 202D may relate to position information associated with a media object selected by a user. Position information 202A-202C may relate to position information associated with automatically selected media objects. In an example embodiment, the automatically selected media objects may help a user understand the context of a media object. For example, position information 202A-202C may relate to position information associated with media objects selected in method 300 of FIG. 3. In another example, position information 202A-202C may relate to position information associated with media objects selected in method 400 of FIG. 4.

Figure 2B:
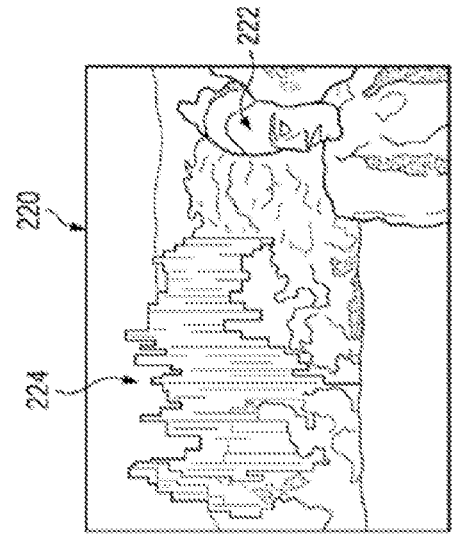
Figure 2C:
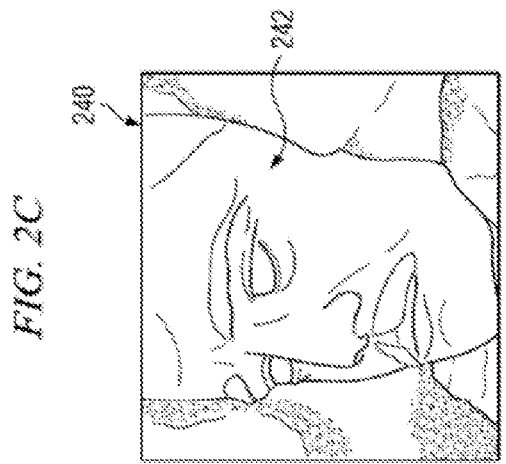

Landmark information 204A and 204B may relate to information associated with a landmark for example landmark 222 of FIG. 2C. For example, landmark information may comprise information related to the location, size, shape, composition, and/or the like, of the landmark. It should be understood that landmark information 204A and 204B are merely provided to clarify example 200 and should not limit the scope of the invention. For example, the invention may or may not utilize landmark information. Street information 206A and 206B may relate to street information.

FIG. 2B is a diagram showing a visual representation 210 of an automatically selected media object. Visual representation 210 may relate to content of an image, a frame of a video, and/or the like. Visual representation 210 may associate with position information 202A of FIG. 2A. For example, position information 202A may relate to position information associated with the generation of the media object represented by visual representation 210. Landmark representation 212 may relate to landmark information 204A of FIG. 2A. Landmark representation 214 may relate to landmark information 204B of FIG. 2A.

FIG. 2C is a diagram showing a visual representation 220 of an automatically selected media object. Visual representation 220 may relate to content of an image, a frame of a video, and/or the like. Visual representation 220 may associate with position information 202B of FIG. 2A. For example, position information 202B may relate to position information associated with the generation of the media object represented by visual representation 220. Landmark representation 222 may relate to landmark information 204A of FIG. 2A. Landmark representation 224 may relate to landmark information 204B of FIG. 2A.

Figure 2D:
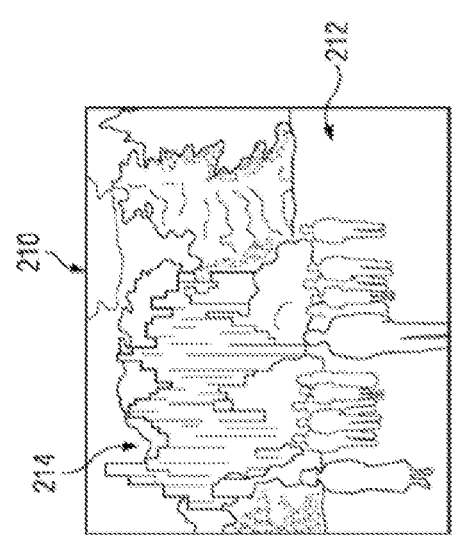

FIG. 2D is a diagram showing a visual representation 230 of an automatically selected media object. Visual representation 220 may relate to content of an image, a frame of a video, and/or the like. Visual representation 230 may associate with position information 202C of FIG. 2A. For example, position information 202C may relate to position information associated with the generation of the media object represented by visual representation 230. Landmark representation 232 may relate to landmark information 204A of FIG. 2A. Landmark representation 234 may relate to landmark information 204B of FIG. 2A.

Figure 2E:
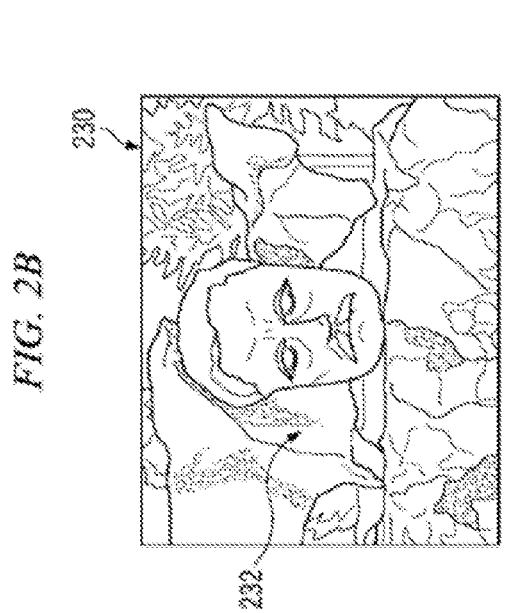

FIG. 2E is a diagram showing a visual representation 240 of a user selected media object. Visual representation 240 may relate to content of an image having, a frame of a video, and/or the like. Visual representation 240 may associate with position information 202D of FIG. 2A. For example, position information 202D may relate to position information associated with the generation of the media object represented by visual representation 240. Landmark representation 242 may relate to landmark information 204A of FIG. 2A.

Figure 3:
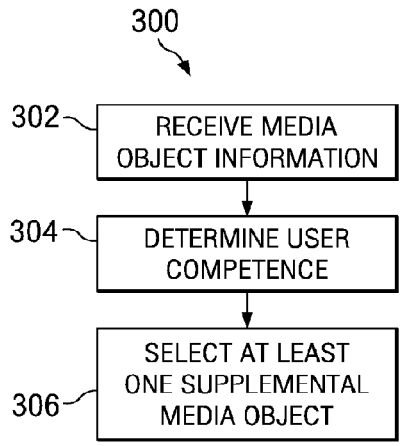
FIG. 3 is a flow diagram showing a method for automatically providing a media object in accordance with an example embodiment of the invention.

FIG. 3 is a flow diagram showing a method 300 for automatically providing a media object in accordance with an example embodiment of the invention. It should be understood, however, that the method of FIG. 3 as illustrated and hereinafter described is merely illustrative of a method which may be associated with providing an image, and therefore, should not be taken to limit the scope of the invention.

At block 302, media object information is received. In an example embodiment, part of the media object information is received from a user, an access device, for example access device 502 of FIG. 5, a server, for example server 508 of FIG. 5, and/or the like. For example, a user may select a media object from a database, a webpage, a local repository, a peer-to-peer network, another device, a portable storage medium, and/or the like. In such an example, part of media object information may be related to a reference to a media object, such as a hyperlink, a path reference, a database reference, and/or the like. In an example embodiment, media object information is received from more than one access device. For example, an access device may provide part of the media object information and another access device may provide another part of the media object information. In an example embodiment, media object information is received from one or more servers. For example, a server may provide part of the media object information and another server may provide another part of the media object information. In such an example, the parts of the media object may be combined in the access device, the server, and/or the like.

At block 304, user competence is determined. In an example embodiment, user competence comprises information related to the ability of a user to comprehend the context of the user selected media object. In an example embodiment, determination of user competence takes into account factors related to past user experience, current user behavior, and/or the like. For example, determination of user competence may utilize information related to places the user has been, media objects the user has experienced, and/or the like. In another example, determination of user competence may utilize information related to movement, device usage, and/or the like. In such an example, the information may be indicative of a level of distraction of the user. For example, a user's ability to understand the context of a media object may be affected by the user conducting a phone call while jogging.

In an example embodiment, a user competence is received instead of determined. For example, a server, such as server 508 of FIG. 5, may receive a determined user competence from an access device, for example access device 502 of FIG. 5.

At block 306 at least one supplemental media object is automatically selected. For example, a media object represented by visual representation 210 of FIG. 2B may be automatically selected. In another example, media objects represented by visual representation 210 of FIG. 2B, visual representation 220 of FIG. 2C, and visual representation 220 of FIG. 2D may be automatically selected.

Figure 4:
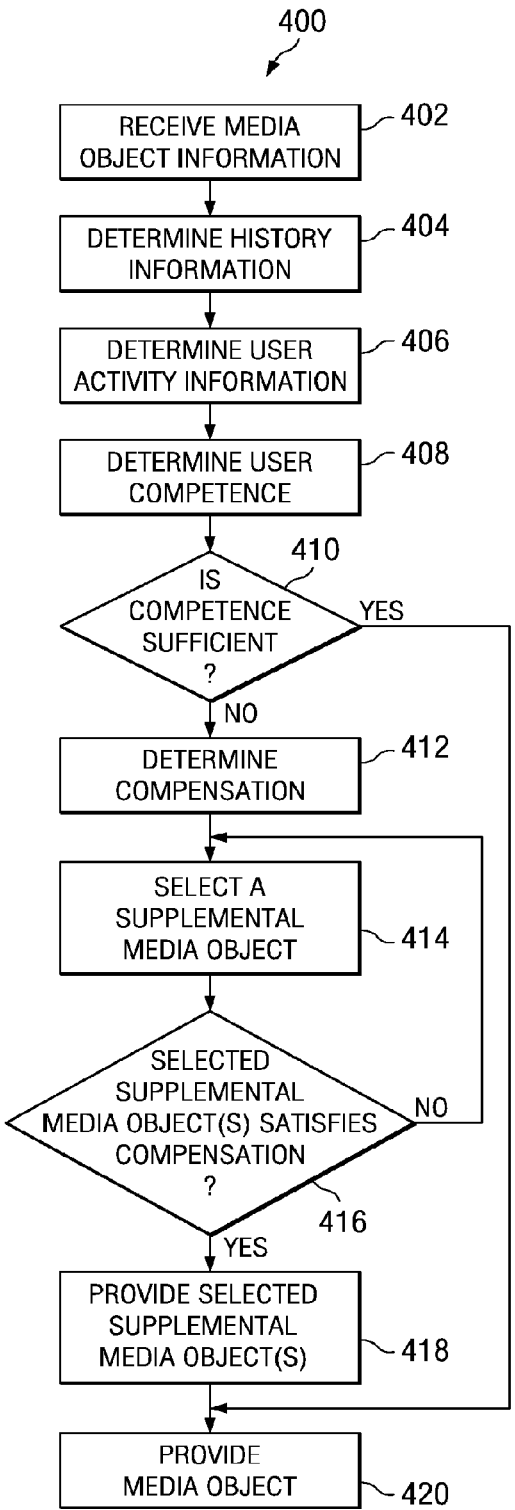
FIG. 4 is flow diagram showing another method for automatically providing a media object in accordance with an example embodiment of the invention.

FIG. 4 is a flow diagram showing another method 400 for automatically providing a media object in accordance with an example embodiment of the invention. It should be understood, however, that the method of FIG. 4 as illustrated and hereinafter described is merely illustrative of a method which may be associated with providing an image, and therefore, should not be taken to limit the scope of the invention.

At block 402, media object information is received. In an example embodiment, part of the media object information is received from a user, an access device, for example access device 502 of FIG. 5, a server, for example server 508 of FIG. 5, and/or the like. For example, a user may select a media object from a database, a webpage, a local repository, a peer-to-peer network, another device, a portable storage medium, and/or the like. In such an example, part of media object information may be related to a reference to a media object, such as a hyperlink, a path reference, a database reference, and/or the like. In an example embodiment, the received media object information may relate to a media object associated with visual representation 240 of FIG. 2E.

In an example embodiment, media object information is received from more than one access device. For example, an access device may provide part of the media object information and another access device may provide another part of the media object information. In an example embodiment, media object information is received from one or more servers. For example, a server may provide part of the media object information and another server may provide another part of the media object information.

At block 404, history information is determined. In an example embodiment, history information relates to information associated with a past experience of a user, device, and/or the like. For example, history information may comprise position information, media object usage information, and/or the like. For example, position information of the history information may relate to position information associated with a place the user, device, and/or the like have been. In such an example, the position of the device may be obtained during the operation of the device. In such an example, the stored position information may become part of the history information. In another example, position information of the history information may relate to position information, for example position information 202A of FIG. 2A, associated with a media object, for example a media object represented by visual representation 210 of FIG. 2B, used by the user. For example, when a user views an image, information related to the image, such as position information, metadata, and/or the like may become part of the history information.

In an example embodiment, history information is obtained during the operation of a device. In another example, position information related to the position of the device may be obtained and stored during the operation of the device. In such an example, history information may comprise the stored position information.

At block 406, user activity is determined. In an example embodiment, user activity relates to an activity being performed by a user which may interfere with a user's ability to understand the context of a media object. For example, user activity may relate to motion information, device activity, monitoring of audio environment, monitoring of visual environment, monitoring of user eye movement, and/or the like. In an example embodiment, user activity is determined using a motion detector, a device monitor, a microphone, a camera, and/or the like. For example, a device monitor may provide information related to the software being utilized by a user. In such an example, a device monitor may provide information related to a phone call, a message being displayed, a game, creation of a media object, publishing of a media object, and/or the like. In another example embodiment, a device may monitor the eye position of the user. In such an example, the device may utilize one or more factors in determining user activity, such as, the amount of eye movement, the object being viewed, and/or the like.

At block 408, user competence is determined. In an example embodiment, user competence is based, at least in part, on one or more evaluation factors. For example, an evaluation factor may be based, at least in part, on history information, user activity information, and/or the like. For example, the history information may relate to the determination of block 404. In another example, user activity information may relate to the determination of block 406.

In an example embodiment, the following equation is utilized to determine user competency related to a media object:

$$C_o = [w_1 \ldots w_i] \begin{bmatrix} F_1 \\ \vdots \\ F_i \end{bmatrix}$$

In the example equation, $C_o$ relates to the user competence related to a media object, F relates to an evaluation factor, and w relates to a weight factor associated with an evaluation factor. There may be one or more evaluation factors utilized to determine user competency. Evaluation factors may relate to history information, user activity information, and/or the like. In the example equation, i relates to the number of evaluation factors utilized in the calculation. For example, there may be 10 evaluation factors utilized in a user competence determination. In such an example, there may be evaluation factors $F_1$ to $F_{10}$ and associated weight factors $w_1$ to $w_{10}$.

A weight factor may be utilized to adjust the level of impact an evaluation factor has on the determination of the user competence. For example, if an evaluation factor is important in determining the user competence, its associated weight factor may be higher than another weight factor associated with another evaluation factor which is less important in determining the user competence.

In an example embodiment, a weight factor may be modified. For example, there may be user feedback associated with a user competence determination. Weight factor modification may be based, at least in part, on the user feedback. In an example embodiment, the device receives information relating to the appropriateness of a user competency determination, such as a positive or negative evaluation. In such an embodiment, one or more weight factors may be modified when a negative response is received. For example, if a past user competence determination reflected no compensation, and a negative evaluation was received relating to the determination, one or more weight factors may be increased to improve the likelihood of compensation being performed under similar circumstances. In another example, if a past user competence determination reflected no compensation, and a negative evaluation was received relating to the determination, one or more weight factors may be reduced to improve the likelihood of compensation not being performed under similar circumstances.

There may be a varying number of evaluation factors utilized in a user competence determination. For example, in some cases, 5 evaluation factors may be utilized in user competence determination, and in other cases, 9 evaluation factors may be utilized. It may be desirable to determine the number of evaluation factors based at least in part on the amount of information which may be utilized. For example, in some cases, there may be 2 evaluation factors related to user activity information and 3 evaluation factors related to history information, and in other cases, there may be 6 evaluation factors related to user activity information and 3 evaluation factors related to history information.

At block 410, it is determined if user competence is sufficient. Determination of sufficient competence may comprise comparing the determined user competence to a threshold. In an example embodiment, it may be desirable to select a supplemental media object if the determined user competence may be below a threshold. If, at block 410, it is determined that user competence is sufficient, the flow proceeds to block 420. If, at block 410, it is determined that user competence is not sufficient, the flow proceeds to block 412.

In an example embodiment, a user competence is received instead of determined. For example, a server, such as server 508 of FIG. 5, may receive a determined user competence from an access device, for example access device 502 of FIG. 5.

At block 412, compensation is determined. In an example embodiment, compensation is used to help the user understand the context of a media object. In an example embodiment, determining compensation comprises determining a number of supplemental media objects to select, a duration to display a supplemental media object, an acceptable user competence for one or more supplemental media objects, and/or the like. In such an example, it may be desirable to control the number of supplemental media objects. For example, compensation determination may indicate that 3 supplemental media objects should be selected. In such an example, compensation determination may indicate that the supplemental media objects should be displayed for 4 seconds each.

In an example embodiment, compensation determination indicates a threshold that the sum of all user competence determinations associated with the selected supplemental media object(s) should surpass. In such a situation, it may be desirable for the number of selected media objects to vary depending on the user competence associated with the supplemental media objects. It may be predetermined whether to measure compensation using a sum of user competence associated with selected supplemental media objects and/or using a number of selected media objects.

At block 414, a supplemental media object is automatically selected. In an example embodiment, visual representations 210 of FIG. 2B, 220 of FIG. 2C, and 230 of FIG. 2D may relate to supplemental media objects. A supplemental media object may be selected from one or more candidate media objects. A candidate media object may be obtained from a database, a server, for example server 508 of FIG. 5, a web page, a data store, and/or the like. For example, a candidate media object may be stored similarly to the media object associated with the received media object information of block 402. In an example embodiment, selection is performed by evaluating information associated with the one or more candidate media objects. For example, selection may utilize position information, metadata, and/or the like associated with a media object when selecting a supplemental media object. For example, information associated with a candidate media object may be compared with history information. For example, position information associated with a candidate media object may be evaluated by its distance from position information related to a location visited by the device, a previously used media object, a location visited by the user, and/or the like. In such an example, user competence associated with a candidate media object may be determined. For example, the following equation may be utilized when determining user competence associated with a candidate media object:

$$\begin{bmatrix} C_{o1} \\ \vdots \\ C_{oj} \end{bmatrix} = \begin{bmatrix} w_{1,1} & \cdots & w_{i,1} \\ \vdots & \ddots & \vdots \\ w_{1,j} & \cdots & w_{i,j} \end{bmatrix} \begin{bmatrix} F_1 \\ \vdots \\ F_i \end{bmatrix}$$

In the example equation, $C_o$ relates to the user competence related to a candidate media object, F relates to an evaluation factor, and w relates to a weight factor associated with an evaluation factor. There may be one or more evaluation factors utilized to determine user competency for a candidate media object. Evaluation factors may relate to history information, user activity information, and/or the like. In the example equation, i relates to the number of evaluation factors utilized in the calculation and j relates to the number of media objects for which user competency may be determined. For example, there may be 10 evaluation factors utilized in a user competence determination. In such an example, there may be evaluation factors $F_1$ to $F_{10}$ and associated weight factors $w_{1,j}$ to $w_{10,j}$. In another example, there may be 5 media objects being evaluated. In such an example, there may be user competency determinations $C_{O1}$ to $C_{O5}$ and associated weight factors $w_{i,1}$ to $w_{i,5}$. It should be understood that although the example equation illustrates determination of user competency for a group of candidate media objects, user competency for a candidate media object may be determined separately from a user competency for another candidate media object, or any combination thereof.

In an example embodiment, a candidate media object is selected based, at least in part, on its determined user competency. For example, a candidate media object may be selected if its determined user competency is above a threshold. In another example, one or more candidate media objects may be selected based, at least in part, on their determined user competencies in relation to the determined user competencies of the other candidate media objects. In such an example, the media objects with the best determined user competency may be selected.

At block 416, it is determined if the selected media object or media objects satisfies the determined compensation. In an example embodiment, the determination may comprise evaluating the number of media objects selected. For example, if it was determined that compensation should comprise 3 media objects, block 416 may determine if 3 media objects have been selected. In another example embodiment, the determination may comprise evaluating the sum of user competence related to selected supplemental media objects. For example, if it was determined that compensation should comprise media objects with associated user competency summed to be above a threshold, the determination may comprise evaluation of the user competency associated with the selected media objects.

If, at block 416, it is determined that compensation has not been satisfied, the flow may return to block 414. If, at block 416, it is determined that compensation has been satisfied, flow may proceed to block 418.

At block 418, the supplemental media object or media objects are provided. In an example embodiment, supplemental media objects associated with visual representations 210 of FIG. 2B, 220 of FIG. 2C, and 230 of FIG. 2D may be provided. In an example embodiment, providing the supplemental media object or supplemental media objects comprises displaying, rendering, playing, and/or the like. In another example embodiment, providing comprises sending the media object to a device. For example, providing may comprise sending the generated animation from a server, for example server 508 of FIG. 5 to an access device, for example access device 502 of FIG. 5. In such an example, providing may comprise utilizing a communication link, for example communication link 510 of FIG. 5.

At block 420, a media object is provided. In an example embodiment, a media object associated with visual representation 240 of FIG. 2E may be provided. The provided media object may be associated with the received media object information of block 402. For example, if the received media object information of block 402 relates to a hyperlink, the media object associated with the hyperlink may be provided. In an example embodiment, providing the media object comprises displaying, rendering, playing, and/or the like. In another example embodiment, providing the media object comprises sending the media object to a device. For example, providing may comprise sending the generated animation from a server, for example server 508 of FIG. 5 to an access device, for example access device 502 of FIG. 5. In such an example, providing may comprise utilizing a communication link, for example communication link 510 of FIG. 5.

FIG. 5 is a block diagram of a system which may benefit from the teachings of the invention. It should be understood, however, that the system of FIG. 5 as illustrated and hereinafter described is merely illustrative of a system, and therefore, should not be taken to limit the scope of the invention.

System 500 may comprise a server 508, and one or more access devices, for example access device 502, access device 504, and access device 506. Server 508 and access devices 502, 504, and 506 may be coupled to each other directly or indirectly. In an example embodiment, server 508 may comprise a computer program, which may store, provide, utilize, and/or the like, map information, media object information, position information, and/or the like. For example, server 508 may comprise a computer program which may comprise an image database, map information, position information related to at least one image, and/or the like. It should be understood that server 508 may comprise more than one apparatus. For example, server 508 may comprise a communication apparatus, a database, a computational apparatus, an authentication server, and/or the like. An access device, for example access device 502, may be used to interact with server 508. For example, an access device, such as access device 502, may be an electronic device, for example electronic device 10 of FIG. 6, a computer, and/or the like. Link 510 may provide communication between access device 502 and server 508. Link 512 may provide communication between access device 504 and server 508. Link 514 may provide communication between access device 506 and server 508. A link, for example link 510, may comprise internet communication, wireless communication, cellular communication, and/or the like.

An access device, for example access device 502, and/or a server, for example server 508, may comprise information related a media object, position information, map information, and/or the like. For example, access device 502 may comprise position information related to a media object, such as position information. In such an example, access device 502 may comprise information relating to a media object being presented to a user.

In an example embodiment, information related to map information is utilized by server 508. For example, server 508 may provide access to a media object. In that example, the media object may be related to position information. In such an example, server 508 may utilize map information and position information related to the media object. For example, server 508 may perform operations for selecting a media object, for example using at least part of method 400 of FIG. 4.

In an example embodiment, server 508 provides access to more than one media object. The media objects may be associated with position information. In such an example, server 508 may utilize map information and position information related to the media objects. For example, server 508 may generate a visual representation of the map information and the position information related to the media objects, for example, position information 104A-104I of FIG. 1.

Figure 6:
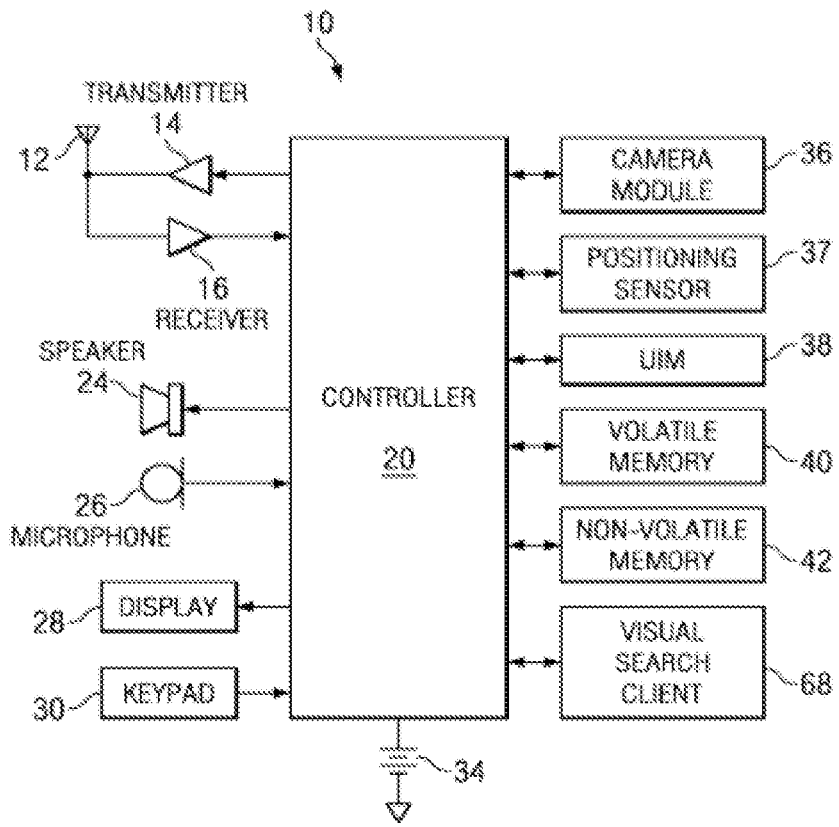
FIG. 6 is a block diagram showing an electronic device which may benefit from the teachings of the invention.

FIG. 6 is a block diagram showing an electronic device, for example, electronic device 10, which may benefit from the teachings of the invention. It should be understood, however, that a electronic device as illustrated and hereinafter described is merely illustrative of an electronic device that would benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, global positioning system (GPS) devices and other types of electronic systems, may readily employ embodiments of the invention. Furthermore, devices may readily employ embodiments of the invention regardless of their intent to provide mobility.

Embodiments of the invention will be primarily described below in conjunction with mobile communications applications. However, it should be understood that embodiments of the invention may be utilized in conjunction with a variety of other applications, both in the mobile communications industries and outside of the mobile communications industries.

The electronic device 10 comprises an antenna 12 (or multiple antennae) in operable communication with a transmitter 14 and a receiver 16. The electronic device 10 further comprises a controller 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (TDMA), GSM, and IS-95 (CDMA), or with third-generation (3G) wireless communication protocols, such as universal mobile telecommunications system (UMTS), CDMA2000, WCDMA and TD-SCDMA, with fourth-generation (4G) wireless communication protocols, wireless networking protocols, such as 802.11, short range wireless protocols, such as Bluetooth, wibree, and/or the like.

It is understood that the controller 20 comprises circuitry desirable for implementing audio and logic functions of the electronic device 10. For example, the controller 20 may comprise a digital signal processor device, a microprocessor device, various analog to digital converters, digital to analog converters, and other support circuits. Control and signal processing functions of the electronic device 10 are allocated between these devices according to their respective capabilities. The controller 20 thus may also comprise the functionality to convolutionally encode and interleave message and data prior to modulation and transmission. The controller 20 may additionally comprise an internal voice coder, and may comprise an internal data modem. Further, the controller 20 may comprise functionality to operate one or more software programs, which may be stored in memory. For example, the controller 20 may operate a connectivity program, such as a conventional Web browser. The connectivity program may then allow the electronic device 10 to transmit and receive Web content, such as location-based content and/or other web page content, according to a Wireless Application Protocol (WAP), Hypertext Transfer Protocol (HTTP), and/or the like, for example.

The electronic device 10 may also comprise a user interface including an output device such as a ringer, a conventional earphone and/or speaker 24, a microphone 26, a display 28, and/or a user input interface, which are coupled to the controller 20. The user input interface, which allows the electronic device 10 to receive data, may comprise any of a number of devices allowing the electronic device 10 to receive data, such as a keypad 30, a touch display (not shown) or other input device. In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 comprises hardware, such as a lens or other optical component(s), and/or software for creating a digital image file from a captured image. Alternatively, the camera module 36 may comprise only the hardware for viewing an image, while a memory device of the electronic device 10 stores instructions for execution by the controller 20 in the form of software for creating a digital image file from a captured image. In an example embodiment, the camera module 36 may further comprise a processing element such as a co-processor which assists the controller 20 in processing image data and an encoder and/or decoder for compressing and/or decompressing image data. The encoder and/or decoder may encode and/or decode according to a standard format, for example, a JPEG standard format.

The electronic device 10 may further comprise a user identity module (UIM) 38. The UIM 38 may be a memory device having a built in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a mobile subscriber. In addition to the UIM 38, the electronic device 10 may be equipped with memory. For example, the electronic device 10 may comprise volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may additionally or alternatively comprise an EEPROM, flash memory or the like. The memories may store any of a number of pieces of information, and data. The information and data may be used by the electronic device 10 to implement the functions of the electronic device 10. For example, the memories may comprise an identifier, such as an international mobile equipment identification (IMEI) code, which may uniquely identify the electronic device 10.

Although FIG. 6 illustrates an example of a electronic device which may utilize embodiments of the invention, it should be understood that the electronic device 10 of FIG. 6 is merely an example device that may utilize embodiments of the invention. For example a device having a processing element for managing memory operations may utilize embodiments of the invention. For example, such a device may also comprise or otherwise be in communication with a memory device. Such a device may comprise some form of user interface. For example, such devices could be, but are not limited to, portable digital assistants (PDAs), pagers, mobile computers, desktop computers, televisions, gaming devices, laptop computers, cameras, video recorders, GPS devices and other types of electronic systems. A processing element such as those described above may be embodied in various ways. For example, the processing element may be embodied as a processor, a coprocessor, a controller or various other processing means or devices including integrated circuits such as, for example, an ASIC (application specific integrated circuit), FPGA (field programmable gate array), and/or the like.

Without in any way limiting the scope, interpretation, or application of the claims appearing below, it is possible that a technical effect of one or more of the example embodiments disclosed herein may be selecting a media object which may improve a users ability to understand context associated with another media object. Another possible technical effect of one or more of the example embodiments disclosed herein may be providing a media object which may improve a user's ability to understand context of another media object.

Embodiments of the present invention may be implemented in software, hardware, application logic or a combination of software, hardware and application logic. The software, application logic and/or hardware may reside on at least one access device or at least one server. If desired, part of the software, application logic and/or hardware may reside on an access device, part of the software, application logic and/or hardware may reside on a server, and part of the software, application logic and/or hardware may reside on another server. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the invention as defined in the appended claims.

The invention claimed is:

1. An apparatus, comprising:
   at least one processor; and
   at least one memory including computer program code for one or more programs, the at least one memory and the computer program code configured to, with the at least one processor, cause the apparatus to perform at least the following,
   receive information related to a media object including one or more visual images;
   determine that a comprehension competency of a user relating to a visual context of the media object is insufficient by one or more current user physical activities, wherein the one or more current user physical activities include one or more user lower body movements;
   before representing the media object, selecting and representing, at a user interface, one or more supplemental media objects until the comprehension competency of the user reaches a threshold, wherein the one or more supplemental media objects include one or more other visual images of one or more areas surrounding the media object; and
   represent the media object at the user interface after the comprehension competency reaches the threshold.

2. An apparatus of claim 1, wherein the apparatus is further caused to:
   determine a number of the one or more supplemental media objects based, at least in part, on the determination that the comprehension competency is insufficient, to compensate for the insufficient competency to a predetermined level,
wherein the context of the media object includes one or more geographic locations, one or more points of interest, or a combination thereof.

3. An apparatus of claim 2, wherein the comprehension competency is further determined based, at least in part, one or more user activity positions, one or more user motions, one or more current user online activities, or a combination thereof, which distracts the user.

4. An apparatus of claim 3, wherein the apparatus is further caused to:
determine at least one of the one or more current user physical activities and the current user online activities based, at least in part, on one or more current user device activities,
wherein the one or more current user device activities includes one or more phone calls being engaged, one or more messages being displayed, one or more games being played, one or more media objects being created, one or more media objects being published, or a combination thereof.

5. An apparatus of claim 1, wherein the apparatus is further caused to:
determine one or more time durations to represent the one or more supplemental media objects based, at least in part, on the determination that the comprehension competency is insufficient, to compensate for the insufficient competency to a predetermined level,
wherein the comprehension competency is determined based, at least in part, on user history information, user position information, user online activity information, or a combination thereof.

6. An apparatus of claim 5, wherein the apparatus is further caused to:
increase a number of the one or more supplemental media objects, a distance of the one or more supplemental media objects showing the geographic area further away, or a combination thereof, in proportion with an insufficient degree of the comprehension competency,
wherein the one or more supplemental media objects are selected based at least in part on history information, position information, or a combination thereof, and the one or more supplemental media objects include one or more additional visual images zoomed into a geographic area shown in the one or more visual images.

7. An apparatus of claim 5, wherein the user history information comprises user media object usage information, and the apparatus is embedded in a mobile phone.

8. An apparatus of claim 1, wherein the one or more supplemental media objects relate to a supplemental context as similar to the context of the media object, and the one or more visual images include one or more animations.

9. An apparatus of claim 1, wherein the one or more supplemental media objects include one or more speed limits, one or more directions, one or more routes, one or more numbers of lanes, one or more traffic conditions, one or more road surfaces, one or more constructions, bicycle lane information, pedestrian accommodation information, or a combination thereof, associated with a geographic area shown in the one or more visual images.

10. An apparatus of claim 1, wherein the one or more user lower body movements include walking, driving a vehicle, jogging, or a combination thereof,
wherein the one or more visual images include one or more photos that are captured by one or more user mobile communication devices and show the one or more points of interest, and the one or more other visual images include one or more other photos showing the one or more points of interest with heading metadata, zoom metadata, or a combination thereof, different from which of the one or more photos.

11. A method comprising:
receiving information related to a media object including one or more visual images;
determining that comprehension competency of a user relating to visual context of the media object is insufficient by one or more current user physical activities, wherein the one or more current user physical activities include one or more user lower body movements;
before representing the media object, selecting and representing, at a user interface, one or more supplemental media objects until the comprehension competency of the user reaches a threshold, wherein the one or more supplemental media objects include one or more other visual images of one or more areas surrounding the media object; and
representing the media object at the user interface after the comprehension competency reaches the threshold.

12. A method of claim 11, further comprising:
determining a number of the one or more supplemental media objects based, at least in part, on the determination that the comprehension competency is insufficient, to compensate for the insufficient competency to a predetermined level,
wherein the context of the media object includes one or more geographic locations, one or more points of interest, or a combination thereof, related to the content and context of the media object.

13. A method of claim 12, wherein the comprehension competency is further determined based, at least in part, one or more user activity positions, one or more user motions, one or more current user online activities, or a combination thereof, which distracts the user.

14. A method of claim 13, further comprising:
determining at least one of the one or more current user physical activities and the current user online activities based, at least in part, on one or more current user device activities,
wherein the one or more current user device activities includes one or more phone calls being engaged, one or more messages being displayed, one or more games being played, one or more media objects being created, one or more media objects being published, or a combination thereof.

15. A method of claim 11, further comprising:
determining one or more time durations to represent the one or more supplemental media objects based, at least in part, on the determination that the comprehension competency is insufficient, to compensate for the insufficient competency to a predetermined level,
wherein the comprehension competency is determined based, at least in part, on user history information, user position information, user online activity information, or a combination thereof.

16. A method of claim 15, further comprising:
increasing a number of the one or more supplemental media objects, a distance of the one or more supplemental media objects showing the geographic area further away, or a combination thereof, in proportion with an insufficient degree of the comprehension competency, wherein the one or more supplemental media objects are selected based at least in part on history information, position information, or a combination thereof, and the one or more supplemental media objects include one or more additional visual images zoomed into a geographic area shown in the one or more visual images.

17. A method of claim 15, wherein the user history information comprises user media object usage information, and the apparatus is embedded in a mobile phone.

18. A method of claim 11, wherein the one or more supplemental media objects relate to a supplemental context as similar to the context of the media object.

19. A method of claim 11, wherein the one or more supplemental media objects include one or more speed limits, one or more directions, one or more routes, one or more numbers of lanes, one or more traffic conditions, one or more road surfaces, one or more constructions, bicycle lane information, pedestrian accommodation information, or a combination thereof, associated with a geographic area shown in the one or more visual images.

20. A method of claim 11, wherein the one or more user lower body movements include walking, driving a vehicle, jogging, or a combination thereof.

* * * * *